United States Patent
Wieringa

Patent Number: 5,913,072
Date of Patent: Jun. 15, 1999

[54] IMAGE PROCESSING SYSTEM IN WHICH IMAGE PROCESSING PROGRAMS STORED IN A PERSONAL COMPUTER ARE SELECTIVELY EXECUTED THROUGH USER INTERFACE OF A SCANNER

[76] Inventor: Fred Wieringa, Kobaltweg 59-61, P.O. Box 40301, 3504 AC Utrecht, Netherlands

[21] Appl. No.: 08/835,441

[22] Filed: Apr. 8, 1997

[51] Int. Cl.[6] .............................. G06F 13/00; G06F 13/10; G06F 15/02

[52] U.S. Cl. .......................... 395/832; 395/825; 395/892; 395/681

[58] Field of Search .................................. 395/832, 825, 395/892, 681

[56] References Cited

U.S. PATENT DOCUMENTS

| | | | |
|---|---|---|---|
| 4,698,770 | 10/1987 | Rattan et al. | 395/892 |
| 5,309,555 | 5/1994 | Akins et al. | 345/330 |
| 5,465,156 | 11/1995 | Arai | 358/296 |
| 5,535,009 | 7/1996 | Hansen | 273/157 R |
| 5,555,099 | 9/1996 | Tetle | 358/401 |
| 5,590,245 | 12/1996 | Leamy et al. | 345/418 |
| 5,598,533 | 1/1997 | Yokota et al. | 395/114 |
| 5,627,977 | 5/1997 | Hickey et al. | 345/329 |
| 5,640,592 | 6/1997 | Rao | 395/825 |
| 5,682,250 | 10/1997 | Jefferson | 358/448 |
| 5,724,555 | 3/1998 | Wadsworth | 395/500 |
| 5,774,357 | 6/1998 | Hoffberg et al. | 364/188 |
| 5,774,721 | 6/1998 | Robinson | 395/683 |

*Primary Examiner*—Thomas C. Lee
*Assistant Examiner*—Ki S. Kim

[57] ABSTRACT

An image processing system provides a very friendly user interface over its scanner for selecting one image processing program to process image signals generated by the scanner. The image processing system comprises a personal computer and a scanner connected to the computer. The scanner comprises a scanning circuit for scanning a document to generate image signals, a user interface containing a display device for displaying message signals and an input circuit for generating selection signals according to user inputs. The computer contains a plurality of image processing programs for processing the image signals generated by the scanning circuit and a scanner control program for transmitting a message signal to the display device of the scanner. The message signal contains one instruction about selecting one of the image processing programs to process the image signals generated by the scanning circuit. The scanner control program activates one of the image processing programs to processing the image signals according to a selection signal received from the scanner which is generated by a user according to the message signal displayed by the scanner control program.

3 Claims, 3 Drawing Sheets

IMAGE PROCESSING SYSTEM IN WHICH IMAGE PROCESSING PROGRAMS STORED IN A PERSONAL COMPUTER ARE SELECTIVELY EXECUTED THROUGH USER INTERFACE OF A SCANNER

BACKGROUND OF THE INVENTION

1. Field of the invention

The present invention relates to an image processing system, and more particularity, to an image processing system which provides a user interface over its scanner for selecting one image processing program to process image signals generated by the scanner.

2. Description of the Prior Art

Personal computer based image processing system comprises a scanner for scanning documents to generate image signals and a personal computer having a plurality of image processing programs in it for processing the image signals. When using such a system, a user has to initiate a scanner control program first in the computer to control the scanner operations and then scan a document into the computer through the scanner. After an image file is created by the scanner control program, the user will initiate one or more image processing programs to process the image file one by one. Such process is not very user friendly since a user has to scan and process the document separately. For users who are not familiar with the computer or software, such process is especially awkward since he or she will has to directly interact with each software through a complex window interface in order to process the image file generated by the scanner.

SUMMARY OF THE INVENTION

It is therefore a primary objective of the present invention to provide a personal computer based image processing system which contains a user interface over a scanner to select an image processing program stored in the personal computer to process image signals generated by the scanner automatically.

Briefly, in a preferred embodiment, the present invention includes an image processing system comprising:

(1) a personal computer having a memory for storing programs and a processor for executing programs stored in the memory;

(2) a scanner connected to the computer comprising:
  (a) a scanning circuit for scanning a document to generate image signals,
  (b) a user interface having a display device for displaying message signals and an input circuit having a plurality of selection keys for generating selection signals according to user inputs, and
  (c) a control circuit for transmitting the image signals generated by the scanning circuit and the selection signals generated by the input circuit to the computer, and for transmitting message signals generated by the computer to the display device; and (3) a plurality of image processing programs stored in the memory for processing the image signals generated by the scanning circuit; and (4) a scanner control program stored in the memory for:
  (a) controlling operations of the scanner,
  (b) transmitting a message signal to the display device through the control circuit, said message signal containing one instruction about selecting one of the image processing programs to process the image signals generated by the scanning circuit, and
  (c) activating one of the image processing programs to processing the image signals according to a selection signal received from the scanner which is generated by a user according to the message signal displayed by the scanner control program.

The activated image processing program further transmits one message signal to the display device and then the scanner control program transmits the selection signals generated by the user according to the displayed message signal to the activated image processing program. The scanner control program comprises a message file for storing selection instructions of the image processing programs and said message signal containing one selection instruction about selecting one of the image processing programs is formed by the scanner control program according to the image file.

It is an advantage of the present invention that the scanner of the image processing system provides a user interface which allows a user to select an image processing program stored in the personal computer directly to process the image signals generated by the scanner.

BRIEF DESCRIPTION OF THE DRAWINGS

Please refer to FIG. 1. FIG. 1 is a perspective view of an image processing system 10 according to the present invention. System 10 comprises a personal computer 14 having a floppy disk 16, a monitor 12 for displaying video images generated by the computer 14, a keyboard 18 for inputting data to the computer 14, and a scanner 22 connected to the computer 14 for scanning documents. The scanner 22 comprises a transparent platform 24 for placing a document to be scanned, a user interface 27 which comprises a display device 26 for displaying message signals and a control panel 28 having a plurality of selection keys for receiving user inputs.

Please refer to FIG. 2. FIG. 2 shows the user interface 27 of the scanner 22 depicted in FIG. 1. The display device 26 is an LCD (liquid crystal display) which is used for displaying operation mode of the scanner 22, and also various scanning instructions or image processing instructions received from the computer 14. The control panel 28 comprises a plurality of selection keys: tour direction keys 30, 32, 34, 36, a start key 42, an ESC (escape) key 40, and an enter key 38. A user can select and control an image processing program stored in computer 14 to process the image file of a scanned document by using the selection keys of the control panel 28 according to the instructions displayed over the display device 26.

Please refer to FIG. 3. FIG. 3 is a function block diagram of the image processing system 10 shown in FIG. 1. The system 10 comprises a personal computer 14, a monitor 12, a keyboard 18 and a scanner 22. The computer 14 comprises a hard disk 66 for storing programs and data, a CPU (central processing unit) 68 for executing programs stored in the hard disk 66, a RAM (random access memory) 70 for storing programs and data for the processor 68, an I/O (input-output) circuit 74 for connecting the floppy disk 16 and keyboard 18, a video circuit 80 which is a VGA (video graphic array) board for performing video processing functions and generating video signals for the monitor 12, a USB (universal serial bus) circuit 64 for communicating with another USB circuit 60 of the scanner 22, and an internal bus 72 for connecting internal components of the computer 14 such as the hard disk 66, CPU 68, RAM 70, I/O circuit 74, video circuit 76, USB circuit 64, etc..

Figure 2:
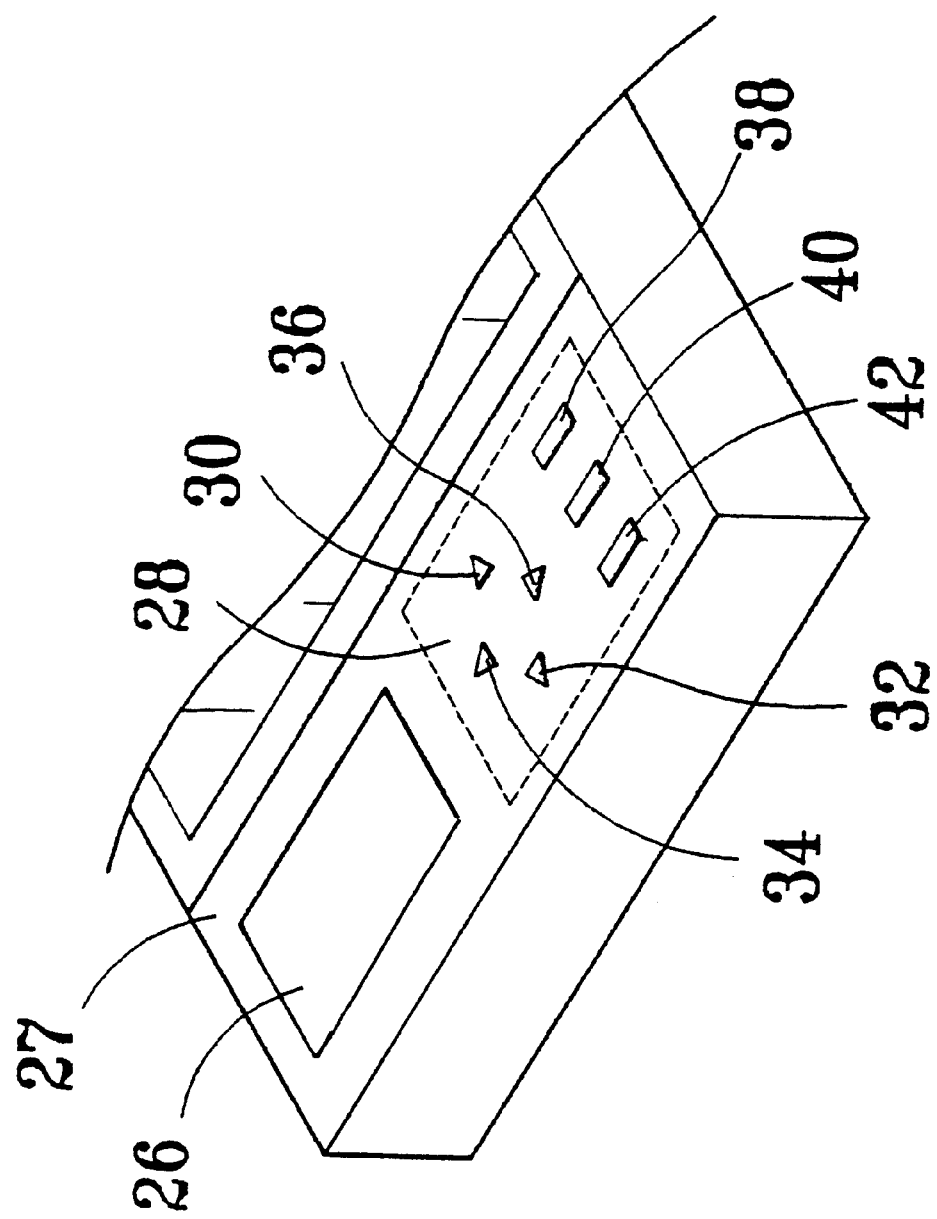
FIG. 2 shows the user interface of the scanner depicted in FIG. 1.
Figure 3:
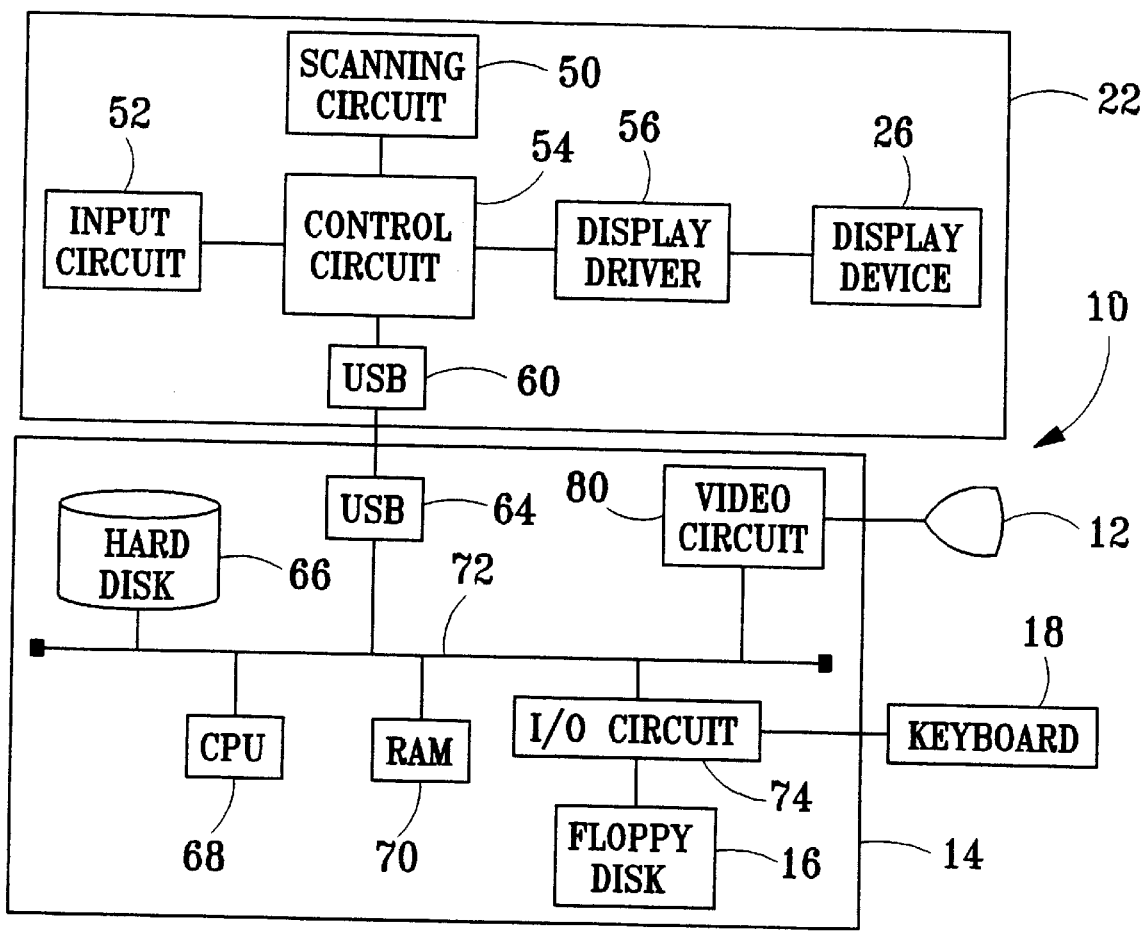
FIG. 3 is a function block diagram of the image processing system shown in FIG. 1.

The scanner 22 comprises a USB circuit 60, an input circuit 52, a scanning circuit 50, a control circuit 54, a display driver 56 and a display device 26. The input circuit 52 is connected to the selection keys of the control panel 28 shown in FIG. 2 and is used for generating selection signals according to user inputs. The scanning circuit 52 which comprises a step-motor and a charge coupled device (not shown) for scanning documents to generate image signals. The control circuit 54 is used for transmitting the image signals generated by the scanning circuit 50 and the selection signals generated by the input circuit 52 to the computer 14, and also for transmitting message signals generated by the computer 14 to the display device 26 through the display driver 56 so that the message signals can be displayed over the display device.

Figure 1:
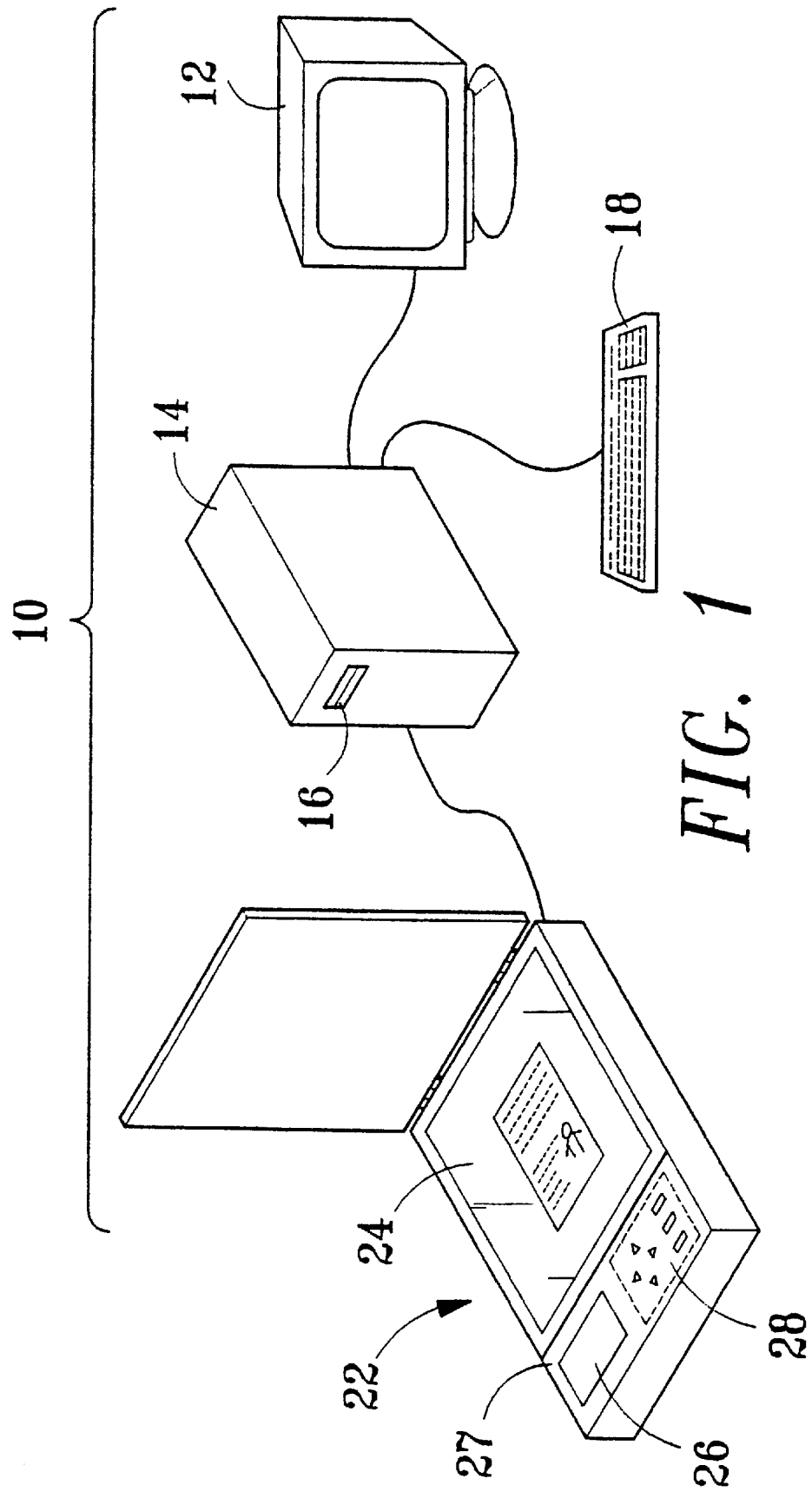
FIG. 1 is a perspective view of an image processing system according to the present invention.
Figure 4:
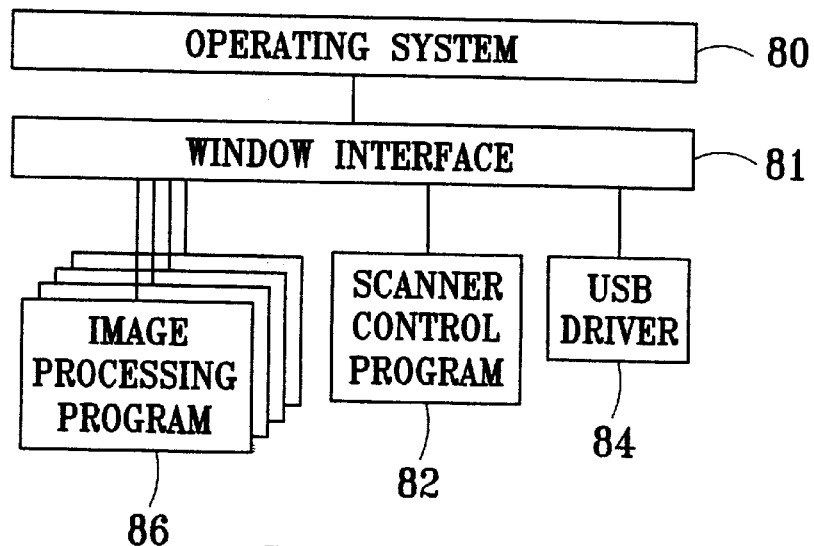
FIG. 4 is a software architecture diagram of the image processing system shown in FIG. 1.

Please refer to FIG. 4. FIG. 4 is a software architecture diagram of the image processing system 10 shown in FIG. 1. All the software programs contained in the software architecture are stored in the hard disk 66 and executed by the CPU 58 of the computer 14. The software architecture comprises an operating system 80 for controlling various operations of the computer 14, a window interface 81 executed under the operating system 80 for supporting all the programs running under it, a USB driver 84 for controlling operations of the USB circuit 64 which passes USB packets between the computer 14 and the scanner 22, a plurality of image processing programs 86 for processing image signals generated by the scanner 22, and a scanner control program 82 for controlling the scanner 22, sending message signals containing various instructions to the display device 26 of the scanner 22 and distributing signals received from the scanner 22.

The image processing programs 86 can be any application program which can process the image signals or data generated by the scanner 22 such as OCR (optical character recognition) software, graphic software, file organizer, facsimile software, etc.. The scanner control program 82 is designed as a platform which comprises a message file (no shown) for storing selection instructions of the image processing programs. One or more message signals can be formed by the scanner control program 82 according to the image file and sent to the display device 26 for assisting a user to select an image processing program 86. The user then enters his/her selection by using the selection keys of the control panel 28 according to the instruction messages displayed over the display device 26. The scanner control program 82 then activates an image processing program according to the selection signals generated by the input circuit 52 and transmits the image signals generated by the scanning circuit 50 to the activated image processing program 86 for further processing.

The scanner control program 84 can also perform a bridge function between the activated image processing program 86 and the scanner 22 so that the activated image processing program 86 can display more instructions or questions over the display device 26 and receives selection signals inputted by the user according to the displayed instructions or questions. When sending an instruction to the user, the activated image processing program 86 transmits one message signal to the display device 26 through the scanner control program 84. The scanner control program 84 then transmits the selection signals generated by the user according to the displayed message signal to the activated image processing program 86.

Through the selection instructions displayed over the display device 26 of the scanner 22, a user can easily select one image processing program 86 to process the image file generated by a document to be scanned. Further instructions can also be provided by the selected image processing program 86 after the program 86 is activated. Such design provides a very simple and direct user interface 27 over the scanner 22 which allows a user to finish his/her image processing job directly by using the display device 26 and the selection keys over the control panel 28.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image processing system comprising:
   (1) a personal computer having a memory for storing programs and a processor for executing programs stored in the memory;
   (2) a scanner connected to the computer comprising:
      (a) a scanning circuit for scanning a document to generate image signals,
      (b) a user interface containing a display device for displaying message signals and an input circuit having a plurality of selection keys for generating selection signals according to user inputs, and
      (c) a control circuit for transmitting the image signals generated by the scanning circuit and the selection signals generated by the input circuit to the computer, and for transmitting message signals generated by the computer to the display device; and
   (3) a plurality of image processing programs stored in the memory for processing the image signals generated by the scanning circuit; and
   (4) a scanner control program stored in the memory for:
      (a) controlling operations of the scanner,
      (b) transmitting a message signal to the display device through the control circuit, said message signal containing one selection instruction about selecting one of the image processing programs to process the image signals generated by the scanning circuit, and
      (c) activating one of the image processing programs to process the image signals according to a selection signal received from the scanner which is generated by a user according to the message signal displayed by the scanner control program.

2. The image processing system of claim 1 wherein the activated image processing program further transmits one message signal to the display device and then the scanner control program transmits the selection signals generated by the user according to the displayed message signal to the activated image processing program.

3. The image processing system of claim 1 wherein the scanner control program comprises a message file for storing selection instructions of the image processing programs and said message signal containing one selection instruction about selecting one of the image processing programs is formed by the scanner control program.

* * * * *